United States Patent [19]

Quick et al.

[11] 4,223,216

[45] Sep. 16, 1980

[54] MEANS FOR SENSING AND COLOR MULTIPLEXING OPTICAL DATA OVER A COMPACT FIBER OPTIC TRANSMISSION SYSTEM

[75] Inventors: William H. Quick, La Habra Heights; Kenneth A. James, Corona Del Mar; Virgil H. Strahan, Orange, all of Calif.

[73] Assignee: Rockwell International Corporation, El Segundo, Calif.

[21] Appl. No.: 5,620

[22] Filed: Jan. 22, 1979

[51] Int. Cl.² ............................................. G01J 3/34
[52] U.S. Cl. ................................. 250/226; 250/231 R
[58] Field of Search ................... 250/226, 227, 231 R, 250/237 G, 568, 199

[56] References Cited

U.S. PATENT DOCUMENTS

| | | | |
|---|---|---|---|
| 3,929,398 | 12/1975 | Bates | 250/226 |
| 3,945,729 | 3/1976 | Rosen | 250/226 |
| 4,045,667 | 8/1977 | Hanson | 250/227 |

*Primary Examiner*—David C. Nelms
*Attorney, Agent, or Firm*—Fischer and Tachner

[57] ABSTRACT

Optical sensor apparatus and associated means by which to color multiplex optically encoded information signals over a compact fiber optic transmission system. The sensor apparatus includes a movable coded masking means. The masking means is fabricated with a plurality of parallel rows, each of which rows comprising a binary weighted pattern of alternately spaced transparent and opaque areas. Incident white light is spectrally dispersed, so that each of the rows of the masking means receives a respective color. As the masking means is moved in response to an input physical parameter that is to be sensed, the corresponding binary coded output color signals that are transmitted through the transparent areas of the masking means are recombined and multiplexed over either a singel optical fiber or a bundle of incoherent optical fibers. After demultiplexing or spectral dispersion of the multiplexed output signal, a photo-detector means is utilized to receive the individual demultiplexed binary coded output color signals and to provide a numerical equivalent of the position of the masking means and, accordingly, the physical parameter represented thereby.

21 Claims, 10 Drawing Figures

MEANS FOR SENSING AND COLOR MULTIPLEXING OPTICAL DATA OVER A COMPACT FIBER OPTIC TRANSMISSION SYSTEM

BACKGROUND OF THE INVENTION

1. Field of the Invention

This invention relates to optical sensor apparatus and to associated means by which to color multiplex optically encoded information signals over a compact fiber optic transmission system, so that an accurate digital representation of a sensed physical parameter is available.

2. Prior Art

In general optical terms, color modulation refers to a technique wherein either of a high-pass, low-pass, or band-pass filter may be utilized to change the color or wavelength of an output optical signal in response to an input physical parameter to be sensed. Briefly, a color modulation system would typically include a source of white or broad-band light that is transmitted to a remote sensor, where it is dispersed by means of a prism, a color filter, a defraction grating, or the like. In response to an input parameter, a small portion of the spectrum of the dispersed light is optically transmitted to a central processor where it is analyzed for spectral characteristics. The spectral characteristics provide an indication of the magnitude of the physical parameter. By way of example, an optical transmission system that utilizes color modulation technique to provide indications of a physical parameter can be found in the copending U.S. patent application entilted METHOD AND APPARATUS FOR A FABREY-PEROT MULTIPLE BEAM FRINGE SENSOR, Ser. No. 005,625 filed Jan. 22, 1979 by the common assignee thereof.

In a binary modulation transmission system, many different output channels and corresponding transmission cables are typically required, with each cable transmitting a respective bit of optically coded information regarding a physical parameter. Consequently, the complexity of such a system may be undesirably increased. Moreover, additional interfacing and signal conversion apparatus may be required, should a digital representation of the physical parameter be desired.

In contrast to the color modulation and binary modulation techniques described above, no prior art is known which shows or suggests an effective technique for color multiplexing optical information signals (that are generated by an optical transducer) on a single optical fiber. In general terms, color multiplexing indicates that different color signals, or optimal frequencies, are transmitted on separate color carriers that are entirely independent of one another. Thus, no prior art is known which discloses means for color multiplexing optical signals, wherein separate optically encoded signals are sent on different color carriers, with each carrier frequency, or color, representing one bit of a binary word that is indicative of a physical parameter sensed by the optical transducer.

SUMMARY OF THE INVENTION

Briefly, and in general terms, disclosed below is an effective technique for color multiplexing optical information signals over a compact fiber optic transmission system. The information signals are provided by a unique optical sensor which is responsive to a physical parameter. Incident white light is supplied to a light dispersing means which acts to break up the light into its spectral components. In one preferred embodiment of the invention, the light dispersing means comprises a color filter. The color filter is fabricated with a plurality of rows, each row being adapted to selectively transmit only one respective color therethrough.

The spectrally dispersed light is supplied to a movable sensor mask that is particularly coded in the Gray coded binary system. More particularly, the sensor mask includes a plurality of parallel rows, each row comprising a binary weighted pattern of alternately spaced transparent and opaque areas. Each information bit of an optically encoded binary output signal is represented by the presence or absence of a color that is transmitted through a respective row of the sensor mask when the mask is moved in response to an input physical parameter. Each row of the movable mask corresponds to a separate output data channel, each output channel providing one bit of a Gray coded binary output signal that is indicative of the movement of the coded sensor mask. The separate coded output color signals are recombined and multiplexed over a single optical fiber or a bundle of incoherent optical fibers. The color multiplexed output signals is demultiplexed or spectrally dispersed by a suitable prism means, or the like. Photodetector and decoder apparatus are responsive to each of the individual demultiplexed output color signals, so that an accurate digital representation of the physical parameter is available for data processing, digital control, or storage.

BRIEF DESCRIPTION OF THE DRAWINGS

FIG. 2b is illustrative of different sequences of optically encoded output color signals that are multiplexed over the fiber optic transmission system of FIG. 1a.

FIG. 3b is a detailed enlargement of the means for color multiplexing optical information signals according to the modification of FIG. 3a.

DESCRIPTION OF THE PREFERRED EMBODIMENT

Figure 1A:
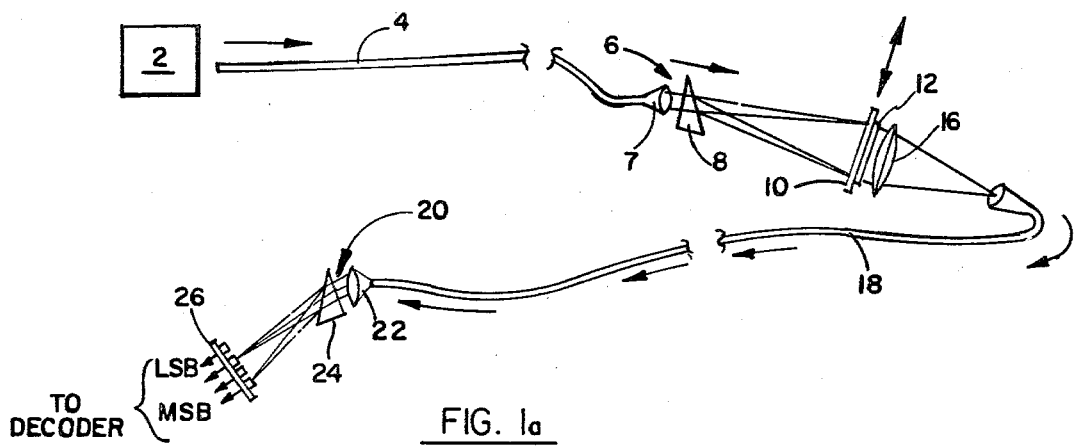
FIG. 1a illustrates the means, including unique optical sensor apparatus, for color multiplexing optical information signals over a compact fiber optic transmission system.

In accordance with one preferred embodiment of the present invention, unique optical sensor apparatus and associated means for color multiplexing optical information signals over a compact fiber optic transmission system are illustrated in FIG. 1a of the drawings. The multiplexed signals may contain information regarding a physical parameter, such as temperature, pressure, or the like, to which the optical sensor apparatus is responsive. A supply of incident white or broadband light is transmitted from a source 2 thereof to a light dispersing system 6 via a well known input silica or quartz optical fiber 4. Light dispersing system 6 includes a focusing lens 7 and a suitable prism 8. Lens 7 may, if desired, be formed at one end of input optical fiber 4 so as to be integrally fabricated therewith. The incident light is broken up into its spectral components by prism 8. The spectrally dispersed light from prism 8 is focused on a stationary narrow optical slit or aperture 10. A movable binary coded sensor mask 12 is positioned behind slit 10 to receive light therethrough. By way of example, coded mask 12 may be driven by a bimetallic strip (not shown) to sense temperature or a bellows (also not shown) to sense pressure. As will be disclosed in greater detail hereinafter, mask 12 performs the function of converting an input physical parameter into a digitized optical output signal.

Figure 1B:
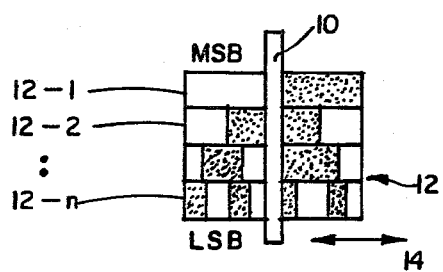
FIG. 1b is a detailed enlargement of the unique optical sensor apparatus that is interfaced with the fiber optic transmission system of FIG. 1a for color multiplexing information signals thereover.

As best depicted in FIG. 1b of the drawings, mask 12 is coded according to the conventional Gray coded binary system. That is, mask 12 includes a plurality of parallel rows, each row comprising a binary weighted pattern of alternately spaced transparent and opaque areas. The mask patterns may be formed by depositing a suitable photographic emulsion on a transparent substrate. Each information bit of the digitized output signal is represented by the presence or absence of a color that is applied to a respective row of mask 12 after spectral dispersion is performed by prism 8. More particularly, each row of mask 12 corresponds to a separate output data channel 12-1, 12-2, ..., 12-n. For another, more generalized discussion of the construction and operation of a Gray coded mask, reference may be made to U.S. patent application Ser. No. 928,222, filed July 26, 1978, the pertinent teachings of which are hereby incorporated by reference.

In operation, coded sensor mask 12 moves relative to the stationary slit 10 (in a direction indicated by arrows 14 of FIG. 1b) in response to an input physical parameter. The resulting patterns of color and the corresponding intensities of the output signals that are transmitted through the transparent areas of the coded rows of mask 12 provide information that is indicative of both the mask position and, accordingly, the magnitude of the parameter. By way of example, the row or data channel 12-1 of mask 12 that is aligned with prism 8 to receive and to selectively transmit the color red (having a long wavelength) can represent the most significant bit (MSB) of the Gray coded binary number, while the data channel 12n of mask 12 that is aligned with prism 8 to receive and to selectively transmit the color blue (having a shorter wavelength) can represent the least significant bit (LSB) of the binary coded number. The coded output color signals from each of the data channels 12-1 ... 12-n of mask 12 are transmitted through a focusing lens 16. Focusing lens 16 recombines the separate output color signals into one signal at one end of an output optical cable 18. Output cable 18 may consist of either a single optical fiber or, if so desired, an incoherent bundle of optical fibers. Optical cable 18 transmits a color multiplexed output signal to a demultiplexing system 20 that comprises a light dispersing lens 22 and a prism 24. The multiplexed output signal is thereby, demultiplexed or dispersed back into its respective spectrum of colors by prism 24. Demultiplexing system 20 interfaces with a suitable photo-electric detector 26, whereby, each color present in the demultiplexed output signal illuminates a corresponding cell thereof. By way of example, photo-electric detector 26 may comprise a linear array of conventional charge coupled device. The intensity of the output signal from photo-electric detector 26 is, thus, representative of a binary coded information signal, which signal is indicative of both the particular position of mask 12 and the magnitude of the physical parameter to be sensed thereby.

Figure 1C:
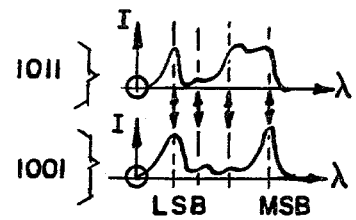
FIG. 1c is a graphic representation of the waveforms of two different sequences of optically encoded color output signals, the respective amplitudes of which sequences being indicative of the binary equivalent of a physical parameter sensed by the optical sensor of FIG. 1b.

By way of two examples, FIG. 1c of the drawings illustrates the relationship between wavelength distribution ($\lambda$) and output light intensity (I) for four different optically encoded color signals that are transmitted on four respective data channels so as to correspond to the binary numbers 1011 and 1001. The output of photo-electric detector 26 can be converted from a Gray code to a conventional binary code according to well known decoding techniques, so that an accurate digital representation of a sensed physical parameter is available for data storage or for further signal processing.

The fiber optic color multiplexing transmission scheme illustrated in FIG. 1a is more advantageous for transmitting optically encoded information signals than are conventional binary color modulation techniques, inasmuch as only a single input optical fiber 4 is required to transmit a supply of incident light from source 2 to slit 12, and an optical cable 18 comprising either a single output optical fiber or an incoherent fiber bundle is required to transmit the coded output color signals from mask 12 to photo-electric detector 26. Therefore, in the instant color multiplexing scheme, optically encoded output signals are transmitted in a form generally shown in FIG. 2b of the drawings, whereby each color that is applied to a corresponding row of movable mask 12 is transmitted via a respective data channel. Hence, after recombination, the binary coded output signals from mask 12 may be multiplexed over a single output optical fiber, thereby increasing the speed and simplicity while lowering the cost of the system. More particularly, in the optical multiplexing system of FIG. 1a, separate optical signals are sent on different color carriers, but each carrier frequency, or color, represents one bit of information of a decoded binary word.

Figure 2A:
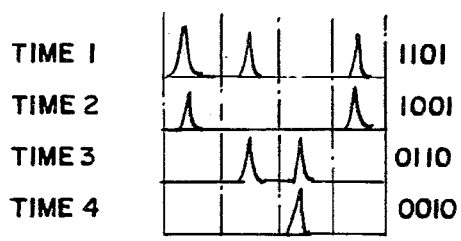
FIG. 2a is illustrative of different sequences of optically encoded output signals that can be transmitted over a conventional binary modulated transmission system.
Figure 2B:
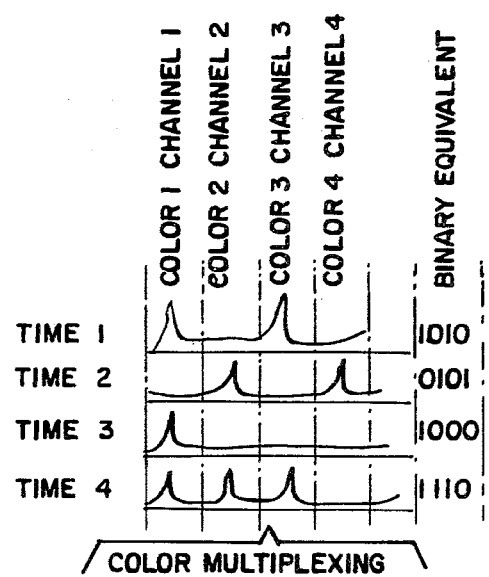

However, in a binary modulation system, such as that which transmits optically encoded output signals in the form generally illustrated in FIG. 2a of the drawings, a separate output optical fiber is required to transmit each channel of output information. Consequently, the cost of fabrication may be increased, while relatively complex interfacing and signal conversion apparatus are typically required.

Moreover, by virtue of the present invention, the multiplexed output signal that is transmitted from mask 12 to detector 26 via optical cable 18 is immediately available in a Gray coded signal format, which format is suitable for digital control, storage or data processing. Alternately, coded mask 12 could be implemented so as to produce optical output signals directly in a conventional binary coded form. However, such a binary coded format typically reduces signal accuracy, inasmuch as potential errors may result from inconsistant switching time between various bits that comprise the resulting binary word.

Figure 3A:
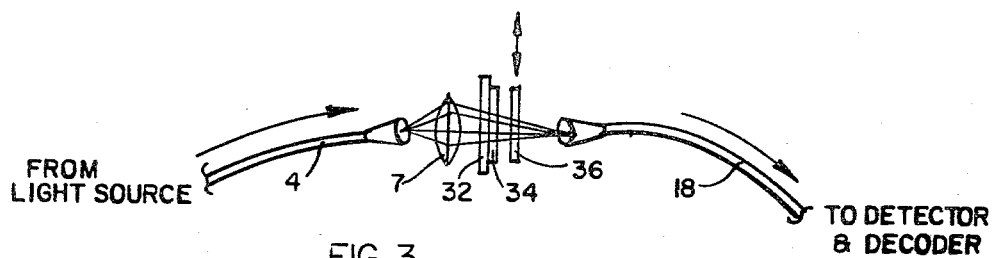
FIG. 3a represents a modification of the means illustrated in FIG. 1a for color multiplexing optical information signals.
Figure 3B:
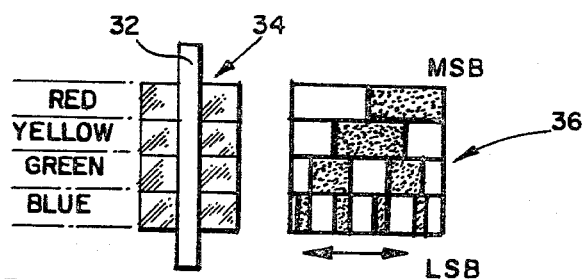

According to a second preferred embodiment of the present invention, a modified transmission system for color multiplexing optically encoded information signals on either a single optical fiber or an incoherent bundle of fibers is illustrated in FIG. 3a of the drawings. More particularly, the light dispersing prism 8 of the fiber optic transmission system of FIG. 1a is replaced by a stationary color filter 34. By way of example, color filter 34 may be any one of a number of well known filters, including those produced by dies or in multiple layers. Examples of the above include either of an interference-type multiple layer filter or a variable or discrete band-pass filter, as will be understood by those skilled in the art. Color filter 34 is positioned behind a narrow, stationary optical slit or aperture 32 and in front of a movable, Gray coded, binary sensor mask 36, which mask is similar in construction and operation to that described above while referring to FIG. 1b. As best illustrated in FIG. 3b of the drawings, color filter 34 is fabricated with a plurality of rows, each of which rows corresponding to a row or data channel of mask 36. For example, filter 34 may include a row that only transmits the color red (having a long wavelength) to the respective row of mask 36 that corresponds to the most significant bit (MSB) of the Gray coded binary output signal. Filter 34 may also include rows that only transmit the colors yellow, green, and blue (of successively shorter wavelengths) to the respective rows of mask 36 that correspond to lesser significant bits (LSB) of the Gray coded binary output signal.

In operation, incident white light is transmitted from a source thereof to focusing lens 7 via input optical fiber 4. Lens 7 focuses the incident light on the optical slit 32. The incident light is passed through slit 32 and applied to filter 34. Filter 34 functions to disperse the incident light, so that each color that is selectively transmitted through a row thereof is supplied to a respective row or data channel of sensor mask 36. Hence, the corresponding intensities of the output color signals that are generated on respective data channels of movable sensor mask 36, as mask 36 moves relative to stationary slit 32 and color filter 34, are indicative of the position of mask 36 and, accordingly, the magnitude of a physical parameter to be sensed. The separate output color signals that are transmitted through the transparent areas of mask 36 are recombined into a single output signal at one end of an optical cable 18 comprising either one of a single optical fiber or a bundle of incoherent optical fibers. Output optical cable 18 thereby transmits a color multiplexed output signal to a suitable demultiplexing system and to photodetector and decoder means, in a similar fashion to that described above when referring to FIG. 1a, so that an accurate digital representation of a sensed physical parameter can be achieved.

Figure 4A:
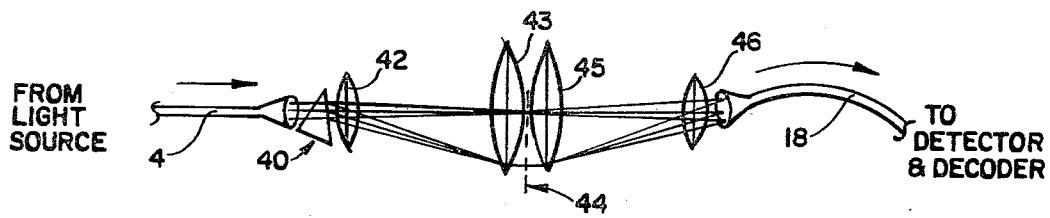
FIG. 4a shows another optical sensor apparatus of the present invention and a corresponding means for color multiplexing optical information signals obtained therefrom over a compact fiber optic transmission system.

In another preferred embodiment of the present invention, FIG. 4a of the drawings illustrates another unique optical sensor apparatus 40 that is adapted to generate information signals regarding a physical parameter to be color multiplexed over an associated fiber optic transmission system. Incident white light is supplied from a source thereof to a light dispersing sensor prism 40 via an input optical fiber 4. However, it is to be recognized that several different colors of incident light may, alternatively, be supplied to sensor prism 40 via a plurality of respective input optical fibers. In accordance with the present embodiment of the invention, sensor prism 40 is fabricated from a material having an index of refraction that is sensitive to changes in the physical parameter to be sensed, so that the manner in which the incident light is dispersed is indicative of the parameter. For example, sensor prism 40 may contain a sample of high-pressure gas, the density of which gas is ultimately to be measured by the dispersal of incident light transmitted therethrough. However, it is to be understood that prism 40 may be replaced by any other suitable incident light beam dispersing or bending device, such as those utilized in conventional solid state sensors. By way of example, one such alternate light dispersing device having suitable application herein is a well known defraction grating (although a grating of this type, when used as a sensor, may possess relatively low sensitivity). Accordingly, it is desirable that the particular light beam dispersing or bending sensor device 40 utilized herein have the characteristic that the amount of light bending produced thereby be a function of the wavelength or color of the incident light supplied thereto.

The color signals that are spectrally dispersed by sensor prism 40 are supplied to a magnification lens 42. The color signals are thereby magnified and supplied to another lens 43. Lens 43 is adapted to re-orient the direction of the dispersed color signals, so that parallel beams of light are passed to an adjacent color multiplex filter mask 44. Color filter 44 acts to selectively transmit particular colors therethrough, depending upon the magnitude of the incident physical parameter and the corresponding amount of incident light dispersion performed by sensor prism 40. Hence, the intensities of the output color signals that can be generated on respective data channels (or rows) of color filter 42 correspond to bits of a Gray coded binary number that is indicative of the physical parameter to be sensed.

Parallel output color signals that are transmitted through color filter 44 are supplied to an adjacent demagnification lens 45. The output color signals are, thereby, demagnified and passed to a focusing lens 46. Focusing lens 46 recombines separate output color signals from filter 44 into a single output signal at one end of an output optical cable 18. Output cable 18 comprises either one of a single optical fiber or a bundle of incoherent optical fibers, as disclosed above. Output optical cable 18 transmits a color multiplexed output signal to a suitable demultiplexing system and to photo-detector and decoder means, in a similar fashion to that described when referring to FIG. 1a of the drawings, so that an accurate digital representation of a sensed physical parameter can ultimately be achieved.

Figure 4B:
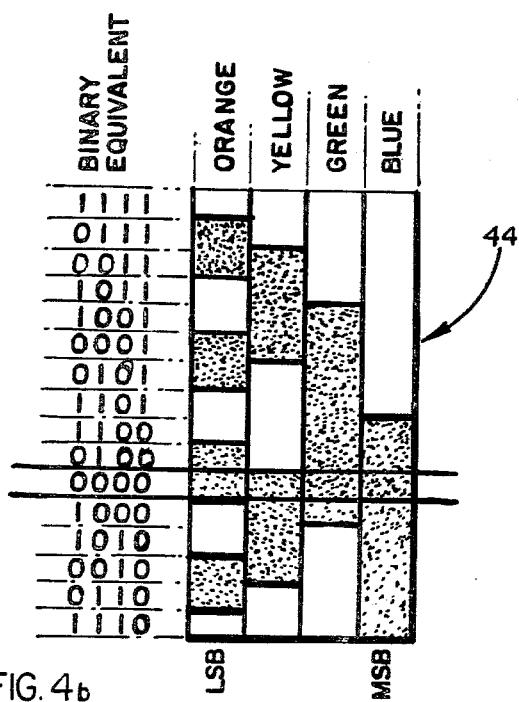
FIG. 4b is a detailed enlargement of a portion of the means of FIG. 4a for color multiplexing the optical information signals.

FIG. 4b of the drawings shows a detailed enlargement of the color multiplexing filter mask 44 of FIG. 4a that is adapted to receive four dispersed incident color signals from the light bending sensor means 40. Color filter 44 is fabricated with a plurality of parallel rows, each of which rows being coded with a particular binary weighted pattern of alternately spaced transparent and opaque areas. Each row of filter 44 is responsive to a respective color of the incident light that is dispersed by the sensor. For example, filter 44 may include a row that only transmits the color orange (having a relatively long wavelength) so as to provide an output color signal that corresponds to the least significant bit (LSB) of a Gray coded binary output signal. Filter 44 may also include rows that selectively transmit the colors yellow, green, and blue (of successively shorter wavelengths) so as to provide output color signals that correspond to more significant bits (MSB) of the binary output signal. Color filter mask 44 is coded in an identical fashion to the coding of the masks 12 and 36 illustrated in FIGS. 1b and 3b, respectively, of the drawings.

In operation, the system is initialized by aligning sensor prism 40 of FIG. 4a with color filter 44 so that substantially no output color signal is transmitted through a row or data channel thereof. That is, each of the four individual colors dispersed by prism 40 is supplied to an opaque area (i.e. representative of a binary 0) of a respective row of filter 44, whereby the corresponding Gray coded binary output signal is 0000. Because sensor 40 is sensitive to changes in a physical parameter in the manner previously disclosed, any parameter change results in a corresponding change in the dispersal or bending of the incident color signal that are applied to the rows of filter 44. Therefore, at least one of the individual incident colors dispersed by prism 40 will be supplied to a transparent area (i.e. representative of a binary 1) of a respective row of filter 44, so that a different Gray coded binary output signal is generated in response to the change in parameter.

The transparent and opaque binary weighted patterns that form the rows of color filter 44 are interfaced with one another so that only one bit changes in each succeeding Gray coded binary signal. For example, as best shown in FIG. 4b, a partial sequence of the possible Gray coded binary output signals that can be generated from color filter 40 as the input parameter changes, after system initialization, is listed below:

Therefore, the intensities of the output color signals that are multiplexed over the output optical cable 18 (of FIG. 4a) can be detected (as best shown in FIG. 1a), so as to correspond to a particular Gray coded binary number, which number is indicative of both the magnitude and direction of the physical parameter to which sensor 40 is responsive.

Figure 4C:
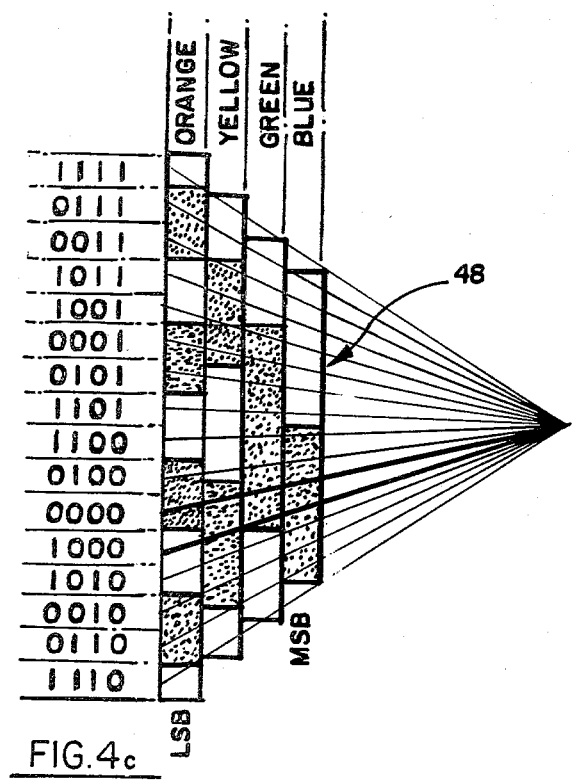
FIG. 4c is a modification of the portion of the fiber optic transmission system illustrated in FIG. 4b including additional means to compensate for variations in optical sensor sensitivity.

As is known to those skilled in the art, sensor prism 40 disperses incident light in a non-linear fashion. Therefore, colors (e.g. red) having a relatively long wavelength are typically bent more or less than those colors (e.g. blue) having relatively shorter wavelengths. Moreover, incident light is not uniformly dispersed when different physical parameters are sensed. FIG. 4c of the drawings illustrates a modification of the color multiplex filter mask 44 of FIG. 4b. According to another preferred embodiment of the present invention, a modified filter mask 48 is disclosed which comprises a plurality of parallel rows of binary weighted patterns of alternately spaced transparent and opaque areas that are uniquely arranged with one another so as to compensate for variations in sensor sensitivity as a result of variations in the colors of the incident light beams. More particularly, the binary coded rows of filter mask 48 that form successively less significant bits (LSB) of the Gray coded output signal have successively increasing lengths to account for different deflections of incident light beams with different wavelengths or colors. Each row of modified filter mask 48 varies in length from a preceeding row according to a predetermined relationship that is dependent upon the dispersion characteristics of the sensor means. However, the possible sequence of Gray coded binary output signals from filter 48 is identical to that obtainable from the color filter mask 44 and illustrated in FIG. 4b, so that an accurate indication of the magnitude and direction of a physical parameter can also be achieved.

It will be apparent that while a preferred embodiment of the invention has been shown and described, various modifications and changes may be made without departing from the true spirit and scope of the invention. For example, the technique for demultiplexing and detecting the multiplexed output color signal (best described when referring to FIG. 1a) can be modified by interposing a conventional color filter (of the type illustrated in FIG. 3b) between the output optical cable 18 and the photo-electric detector 26. The mutliplexed output color signal is transmitted through the color filter, so that each cell of the photo-detector is responsive to the intensity of a respective output color signal.

Having thus set forth a preferred embodiment of the present invention, what is claimed is:

1. An optical sensing system comprising:
   first light transmission means for transmitting a supply of broadband incident light signals,
   light dispersing means to receive and spectrally disperse the incident light signals supplied by said first light transmission means,
   transducer means aligned with said light dispersing means to receive at least some of the color signals that are spectrally dispersed thereby, said transducer means having associated means by which to transmit certain color signals and to absorb certain other color signals in response to an incident physical parameter to be sensed thereby, and
   detector means responsive to the intensity of each of the color signals transmitted by said transducer means so as to provide an indication of the physical parameter.

2. The optical sensing system recited in claim 1, further including second light transmission means for transmitting said color signals from said transducer means to said detector means.

3. The optical sensing system recited in claim 2, wherein said second light transmission means includes at least one optical fiber.

4. The optical sensing system recited in claim 2, further including optical means interfaced with said transducer means for combining the spectrally dispersed color signals that are transmitted by said transducer means, whereby a color multiplexed information signal is transmitted to said detector means via said second light transmission means.

5. The optical sensing system recited in claim 4, further including demultiplexing means interfaced with said second light transmission means for spectrally dispersing the color multiplexed information signal transmitted thereby, whereby each dispersed color signal is supplied to said detector means.

6. The optical sensing system recited in claim 5, wherein said demultiplexing means comprises a prism.

7. The optical sensing system recited in claim 1, wherein said detector means includes at least one photoelectric cell.

8. The optical sensing system recited in claim 1, wherein said light dispersing means comprises a prism.

9. The optical sensing system recited in claim 1, wherein said light dispersing means comprises a color filter, said color filter being fabricated with a plurality of color sensitive areas that are adapted to selectively transmit respective incident light colors to said transducer means.

10. The optical sensing system recited in claim 9, wherein each of the color sensitive areas of said color filter are arranged in parallel rows with respect to one another, so that each row is adapted to selectively transmit a respective color.

11. The optical sensing system recited in claim 1, wherein said transducer means includes a binary coded mask, the particular alignment of which mask with said light dispersing means being dependent upon the incident physical parameter to be sensed, so that the intensity of the color signals transmitted by said mask provides a binary representation of the relative position of said mask and, accordingly, the physical parameter.

12. The optical sensing system recited in claim 11, wherein said binary coded mask includes a plurality of rows, each row comprising a pattern of alternately spaced transparent and opaque areas and corresponding to one bit of the binary representation of the physical parameter, and
    each of said rows being aligned with said light dispersing means to receive a respective color signal therefrom, whereby the transmission of a color signal by a row is indicative of a binary 1 and the absorption of a color signal by a row is indicative of a binary 0.

13. An optical sensing system comprising:
    light transmission means for transmitting a supply of broadband incident light signals,
    transducer means to receive and spectrally disperse the incident light signals supplied by said light transmission means, said transducer means being fabricated so that the amount of light dispersion provided by said transducer means is indicative of an incident physical parameter to be sensed thereby,
    color sensitive masking means to receive at least some of the color signals that are spectrally dispersed by said transducer means, said masking means having associated means by which to selectively transmit certain color signals and to absorb certain other color signals, and
    detector means responsive to the intensity of each of the color signals transmitted by said masking means so as to provide an indication of the physical parameter.

14. The optical sensing system recited in claim 13, wherein said transducer means comprises a prism that is fabricated from a material, the index of refraction of which is responsive to changes in the incident physical parameter to be sensed.

15. The optical sensing system recited in claim 13, wherein said light transmission means includes at least one optical fiber.

16. The optical sensing system recited in claim 13, wherein said masking means comprises a color filter including a plurality of binary coded rows, each of said rows comprising a pattern of alternately spaced transparent and opaque areas and corresponding to one bit of a binary number, which number is indicative of the physical parameter to be sensed, and
    each of said rows being aligned with said transducer means to receive a respective color signal dispersed thereby, so that the transmission of a color signal by a row is indicative of a binary 1 and the absorption of a color signal by a row is indicative of a binary 0.

17. The optical sensing system recited in claim 16, wherein each of the binary coded rows of said filter masking means that forms a successively less significant bit of the binary coded numerical indication of the physical parameter has a successively increasing length, so as to compensate for variations in the sensitivity of said transducer means as a result of variation in the color signals that are spectrally dispersed thereby.

18. The optical sensing system recited in claim 17, wherein the lengths of the successive rows of said binary coded filter masking means increase according to a predetermined relationship that is dependent upon the dispersion characteristics of said transducer means.

19. The optical sensing system recited in claim 13, further including optical means interfaced with said masking means for combining the dispersed color signals selectively transmitted thereby, and
    additional light transmission means for transmitting a color multiplexed information signal from said optical means to said detector means, said color multiplexed signal comprising the combined color signals transmitted by said masking means.

20. The optical sensing system recited in claim 19, wherein said additional light transmission means includes at least one optical fiber.

21. An optical sensor for sensing an incident physical parameter, said sensor being particularly positioned in response to the incident parameter in order to receive a plurality of input color signals, said sensor including:
    masking means including a plurality of rows that are adapted to receive and to either selectively transmit or absorb respective input color signals,
    each of said rows having a pattern of alternately spaced transparent and opaque areas and corresponding to one bit of a Gray coded binary number, which number is indicative of both the particular position of said sensor and the magnitude of the incident parameter represented thereby,
    the transmission of a color signal through a transparent area of a row representing a binary 1 of the Gray coded binary number, and the absorption of a color signal by an opaque area of a row representing a binary 0 of the coded binary number.

* * * * *